Patented May 23, 1939

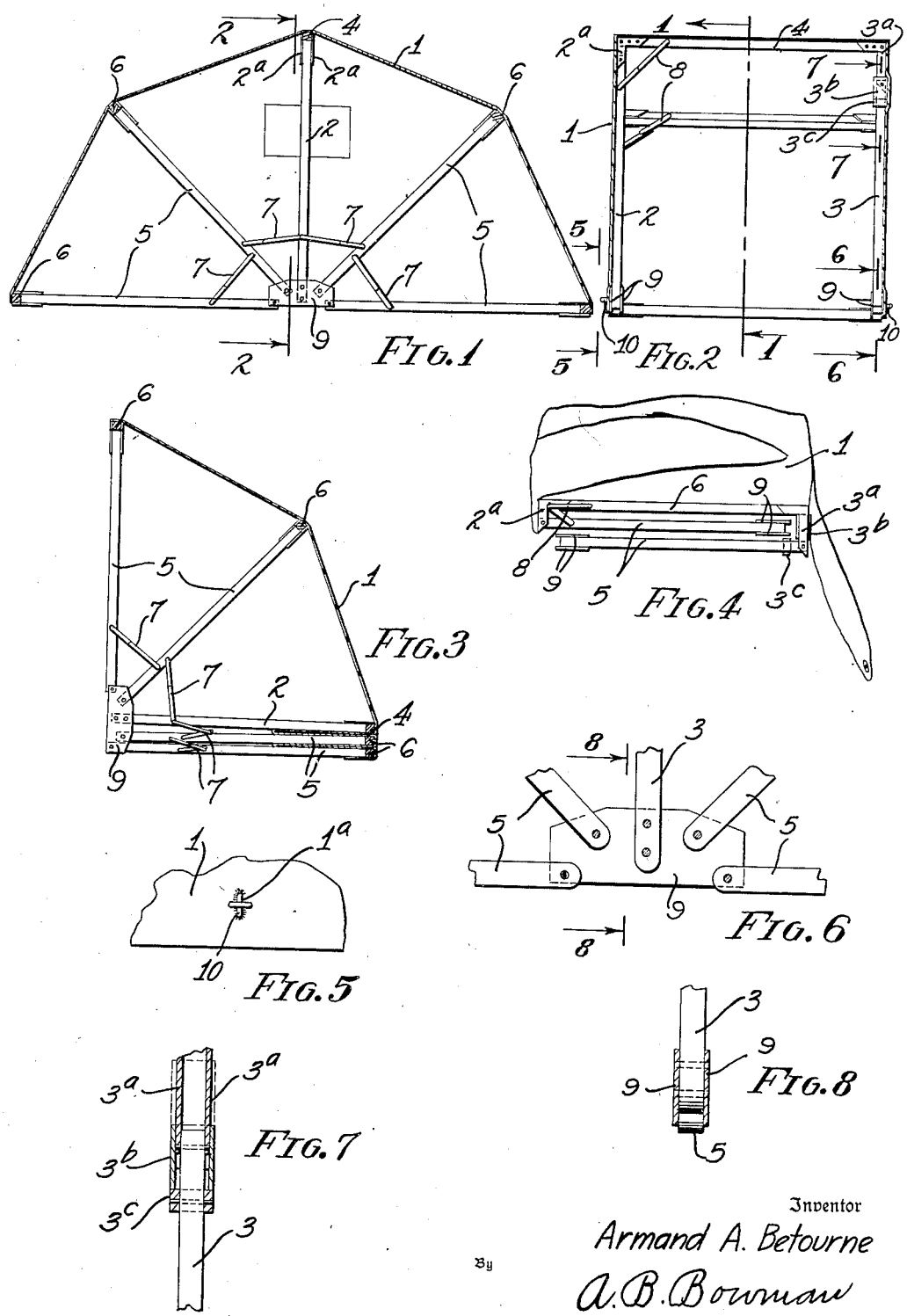

2,159,309

UNITED STATES PATENT OFFICE 2,159,309

COMBINED SUNSHADE AND TENT

Armand A. Betourne, San Diego, Calif.

Application April 28, 1936, Serial No. 76,749

4 Claims. (Cl. 135—4)

My invention relates to a combined sun shade and tent, and the objects of my invention are:

First, to provide a tent structure which may be folded partially to form a sun shade for shade or other weather conditions.

Second, to provide an apparatus of this class which may be folded up to various degrees for protection from the sun and elements.

Third, to provide an apparatus of this class which is collapsible into very compact form for transportation.

Fourth, to provide an apparatus of this class which is supported rigidly whether in full extended position or partially collapsed.

Fifth, to provide an apparatus of this class which is rigidly braced in its various collapsed positions.

Sixth, to provide an apparatus of this class which is easily and quickly transformed from tent to sun shade form, and from sun shade to tent form, and Seventh, to provide an apparatus of this class which is very simple and economical of construction, durable, efficient, and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a sectional view of the tent in open tent form from the line 1—1 of Fig. 2. Fig. 2 is a sectional view from the line 2—2 of Fig. 1. Fig. 3 is a sectional view similar to that of Fig. 1 showing the apparatus partially collapsed in sun shade form used for a shade. Fig. 4 is a side elevational view showing the folded collapsed form of the side stays. Fig. 5 is a view from the line 5—5 of Fig. 2. Fig. 6, a sectional view on an enlarged scale from the line 6—6 of Fig. 2. Fig. 7, a sectional view on an enlarged scale from the line 7—7 of Fig. 2; and Fig. 8, a sectional view from the line 8—8 of Fig. 6.

Similar characters of reference refer to similar parts and portions throughout the several views of the drawing:

The cover 1, middle side stays 2 and 3, middle cross bar 4, pivotal side stays 5, cross bars 6, foldable braces 7 and 8, main supporting plates 9, and canvas latches 10, constitute the principal parts and portions of my combined sun shade and tent.

The cover is preferably flexible canvas, shaped to fit over the top of the frame and sides and is tight when extended as shown in Fig. 1 of the drawing. The middle side stays 2 and 3 are rigidly secured between two plates 9 which are in pairs on opposite sides of the tent structure. The stay 2 is pivotally mounted between two plates 2a at its upper end while the stay 3 is pivotally mounted in a similar manner between two plates 3a at its upper end. The vertical portion of the plates 3a is longer than the vertical portion of the plates 2a so that the member 2 may be folded up near the cross member 4, and the member 3 folded up near the stay 2, as shown best in Fig. 4 of the drawing. The stay 3 is provided with a sleeve member 3b which is shiftably mounted upwardly above the pivotal joint between the members 3 and 3a for pivoting the member 3, but when shifted to the position shown in Fig. 2 of the drawing, provides a rigid joint and prevents the movement of the stay member 3 relative to the members 3a. This sleeve rests against a collar 3c on the stay member 3 when in its lowered position. Mounted between the normally horizontal portions of the members 2a and 3a is the middle cross bar 4, which is rigidly secured between these pairs of members 2a and 3a. The stay members 5 of which I have shown 2 on opposite sides of the middle stay members 2 and 3 are pivotally supported between the pairs of plates 9 at opposite sides, and these stay members at one side are pivoted between brackets 2a at their upper ends and on the opposite sides are supported between pairs of brackets 3a the vertical portions of which are longer than the vertical portions of members 2a so that the members 5 on one side are foldable to near the cross bars 6 as hereinbefore described relative to the stays 2 and 3. The stays 2, 3 and 5 are all supported in spread relation as shown best in Fig. 1 of the drawing by means of foldable braces, 7 which fold only one way and are of conventional type thus permitting the relative shifting of the members 2, 3 and 5 as shown best in Fig. 3 of the drawing, but when said members 7 are extended, from rigid braces for holding said members in spread relation. Connecting the members 2 and 4 and the members 5 and 6 are similar foldable braces 8 which permit the pivotal movement of the members 2 and 5. It will be noted that the foldable braces 8 are only positioned in the one side and fold up as shown best in Fig. 4 of the drawing.

The operation of my combined sun shade and tent is as follows: When in the tent form as shown in Figs. 1 and 2 of the drawing the braces 7 and 8 are extended as shown and the tent is in rigid full open position. If it is desired to open one side and form a more sun shade type, the braces 7 on the one side of the center piece are folded and the center piece turned down to a substantially horizontal position, setting the plates 9 on end, all as shown best in Fig. 3 of the drawing, the cover 1 folding in between the folded members 2 and 5. If it is desired to collapse the apparatus the cover 1 is removed by turning the latches in the slots 1a, then all of the side stays are folded together by folding the members 7, then the foldable braces 8 are folded and the member 2 and the members 5 on the same side are folded to adjacent the members 4 and 6, then the members 3 and other members 5 on the opposite side are folded against these members as shown best in Fig. 4 of the drawing, then the frame including the stays and cross bars in the folded position are wrapped in the canvas, making a compact bundle.

Though I have shown and described a particular construction combination and arrangement of parts and portions, I do not wish to be limited to this particular construction, combination and arrangement, but desire to include in the scope of my invention, the construction combination and arrangement substantially as set forth in the appended claims.

Having thus described my invention, what I claim as new and desire to secure by Letters Patent is:

1. In a combined sun shade and tent of the class described, the combination of a pair of oppositely disposed spaced plates, middle stay members rigidly and immovably secured to the middle of each of said plates and extending therefrom, a cross bar connecting the extended ends of said stay members, a plurality of similar stay members pivotally connected to said plates on opposite sides of said first mentioned stay members and adjacent thereto and adjacent to each other, cross bars connecting said pivotally mounted stays, and foldable braces connecting all of said stays at one side adapted to hold all of them in spread relation to each other when said braces are extended and foldable substantially together when said braces are folded.

2. In a combined sun shade and tent of the class described, the combination of a pair of oppositely disposed spaced plates, middle stay members rigidly secured to each of said plates and extending therefrom, a cross bar connecting the extended ends of said stay members, a plurality of similar stay members pivotally connected to said plates on opposite sides of said first mentioned stays and adjacent thereto and adjacent to each other, cross bars connecting said pivotally mounted stays, foldable braces connecting all of said stays at one side adapted to hold all of them in spread relation to each other when said braces are extended and foldable substantially together when said braces are folded, whereby some of said stay members may be folded substantially together and other of said stay members be extended and said plates turned on another side to form a shade umbrella.

3. In a combined sun shade and tent of the class described, the combination of a pair of oppositely disposed spaced plates, a stay member rigidly and immovably secured to the middle of each of said plates and extending therefrom, a cross bar connecting the extended ends of said stay members, a plurality of similar stay members pivotally connected to each of said plates on opposite sides of said rigidly and immovably secured stay member and adjacent to each other, cross bars connecting said pivotally mounted stays, foldable braces connecting said pivotally mounted stays with said rigidly mounted stays at one side adapted to hold said pivotally mounted stays in spread relation relatively to said rigidly mounted stay when said braces are extended and foldable substantially together when said braces are folded.

4. In a combined sun shade and tent of the class described, the combination of a pair of oppositely disposed spaced plates, each plate having a long flat side and short flat ends, middle stay members rigidly and immovably secured to the middle of each of said plates and extending therefrom some distance, a cross bar connecting the extended ends of said stay members, a plurality of similar stay members pivotally connected to said plates on opposite sides of said rigidly and immovably secured stay member in spaced relation to each other toward the opposite ends of said plate, cross bars connecting said pivotally mounted stays with each other, foldable braces connecting said pivotally connected stays with each other and with said rigidly and immovably secured stays adapted to hold them in spread relation to each other when said braces are extended and foldable substantially together when said braces are folded.

ARMAND A. BETOURNE.